US009069864B2

(12) United States Patent
Liu

(10) Patent No.: US 9,069,864 B2
(45) Date of Patent: Jun. 30, 2015

(54) PRIORITIZING A CONTENT ITEM FOR A USER

(71) Applicant: Google Inc., Mountain View, CA (US)

(72) Inventor: Yifang Liu, Redwood City, CA (US)

(73) Assignee: Google Inc., Mountain View, CA (US)

( * ) Notice: Subject to any disclaimer, the term of this patent is extended or adjusted under 35 U.S.C. 154(b) by 237 days.

(21) Appl. No.: 13/624,831

(22) Filed: Sep. 21, 2012

(65) Prior Publication Data

US 2014/0090038 A1 Mar. 27, 2014

(51) Int. Cl.
*G06F 17/30* (2006.01)
*H04L 12/18* (2006.01)

(52) U.S. Cl.
CPC ....... *G06F 17/30867* (2013.01); *H04L 12/1822* (2013.01)

(58) Field of Classification Search
CPC .................................................. H04L 12/1822
USPC .............................................. 726/7
See application file for complete search history.

(56) References Cited

U.S. PATENT DOCUMENTS

| 6,026,368 | A | * | 2/2000 | Brown et al. ............... 705/14.56 |
|---|---|---|---|---|
| 7,752,152 | B2 | | 7/2010 | Paek et al. |
| 8,200,661 | B1 | | 6/2012 | Pearce et al. |
| 2010/0205191 | A1 | | 8/2010 | Meng et al. |
| 2012/0124089 | A1 | | 5/2012 | Sim et al. |

OTHER PUBLICATIONS

Zukerman, et al., "Predictive Statistical Models for User Modeling", User Modeling and User-Adapted Interaction, 2001, pp. 5-18, vol. 11.
Ashbrook, et al., "Learning Significant Locations and Predicting User Movement with GPS", Sixth International Symposium on Wearable Computers, ISWC, 2002, pp. 101-108.
Kang, et al., "Establishing Value Mappings Using Statistical Models and User Feedback", Proceedings of the 14th ACM International Conference on Information and Knowledge Management, 2005, pp. 68-75.
Sosnovsky, "Ontological Technologies for User Modeling", State-of-the-Art Paper Submitted to the Information Science PhD. Committee of the School of Information Sciences, University of Pittsburgh as Part of Requirements for the Comprehensive Examinations, Nov. 29, 2007.

* cited by examiner

*Primary Examiner* — Jacob Lipman
(74) *Attorney, Agent, or Firm* — McDermott Will & Emery LLP

(57) ABSTRACT

The disclosed subject matter relates to methods for prioritizing a content item for a user. In one aspect, a method includes receiving user authentication events corresponding to a user account. A user is associated with the user account. The method further includes determining a time distribution of the received user authentication events. The method further includes constructing, based on the determination, a content prioritization user model corresponding to the user associated with the user account. The method further includes receiving a content item associated with the user. The method further includes associating, based on the content prioritization user model, a content priority value with the content item. The content priority value corresponds to a predicted aspect of the user.

18 Claims, 7 Drawing Sheets

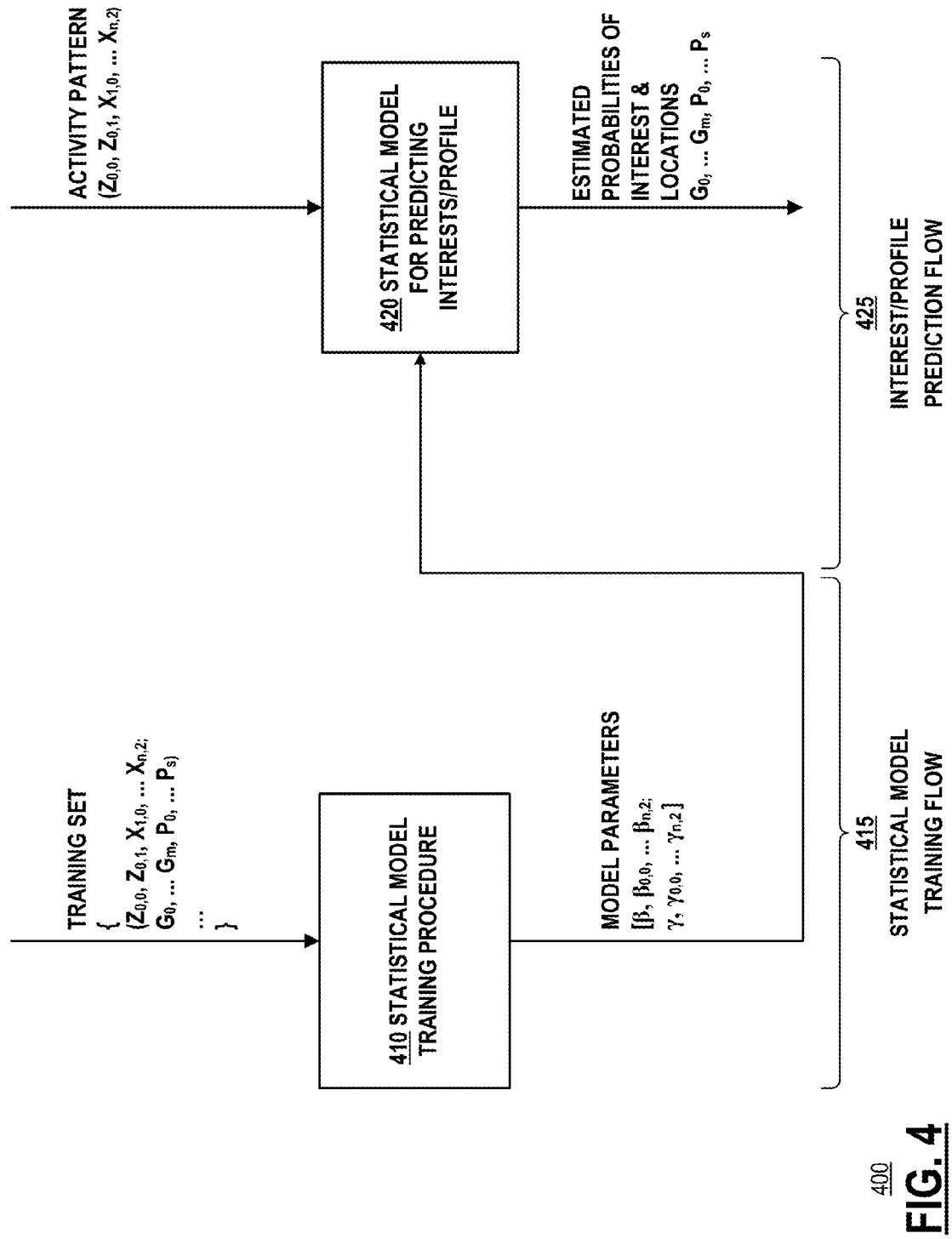

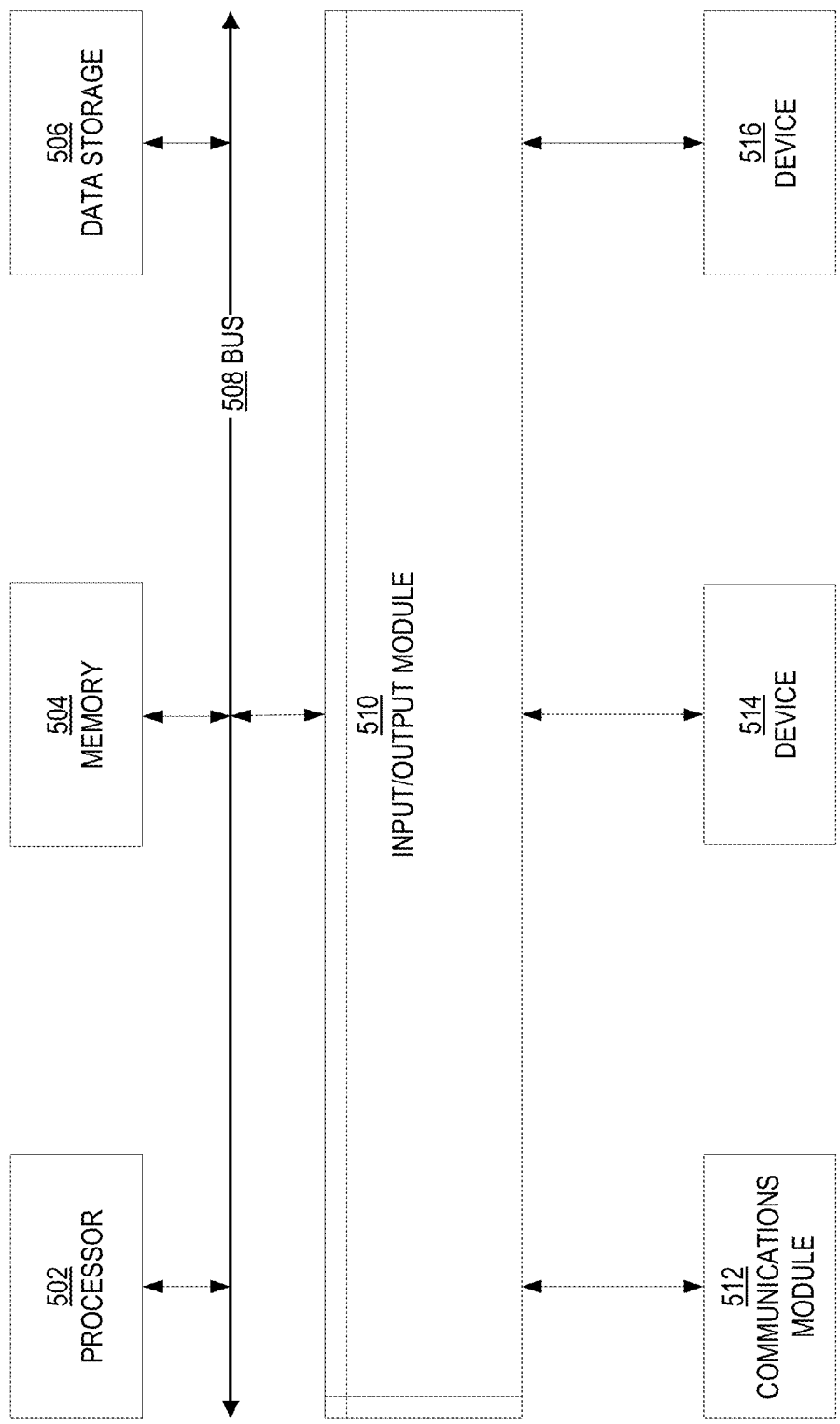

PRIORITIZING A CONTENT ITEM FOR A USER

BACKGROUND

The present disclosure generally relates to prioritizing a content item and, in particular, to prioritizing a content item for a user based on a content prioritization model constructed based on the user's user account authentication events.

A user may have specific interests, and may prefer to consume content related to those interests. As an example, a user may be interested in a particular entertainer. Thus, when visiting an online entertainment tabloid website, the user may prefer to view stories, gossip columns, photographs, videos, etc., relating to that entertainer. To that end, the user may have to search for stories related to that entertainer.

SUMMARY

In one innovative aspect, the disclosed subject matter can be embodied in a method. The method includes receiving user authentication events corresponding to a user account. A user is associated with the user account. The method further includes determining a time distribution of the received user authentication events. The method further includes constructing, based on the determination, a content prioritization user model corresponding to the user associated with the user account. The method further includes receiving a content item associated with the user. The method further includes associating, based on the content prioritization user model, a content priority value with a content item. The content priority value corresponds to a predicted aspect of the user.

These and other embodiments can include one or more of the following features. The predicted aspect of the user can be a predicted interest of the user, or a predicted location corresponding to the user. The user authentication events can correspond to authentication, based on the user account, to an online resource. The online resource can be a website, a service, or an Application Programming Interface ("API"). The content item when associated with the content priority value, results in a prioritized content item. Construction of the content prioritization user model can include selecting one or more decision variables from a plurality of decision variables. The construction can further include selecting one or more user model variables from a plurality of user model variables. A statistical model can be implemented based on the selected decision variable(s) and user model variable(s). The statistical model can be trained based on a training set, which includes tuples of the selected decision variable(s) and user model variable(s). The statistical model can be logistic regression. The decision variable can be the time distribution of the received authentication events. The time distribution of the received authentication events can include a mean and a variance respectively of the time of the user authentication events. The content prioritization user model can be updated based on user feedback. User feedback can include a reaction of the user in response to the prioritized content item.

In another innovative aspect, the disclosed subject matter can be embodied in a system. The system includes a memory which includes instructions, and a processor. The processor is configured to execute the instructions to receive user authentication events corresponding to a user account. A user is associated with the user account. The received user authentication events correspond to authentication, based on the user account, to an online resource. The processor is further configured to determine a time distribution of the received authentication events. The processor is further configured to construct, based on the determination, a content prioritization user model corresponding to the user associated with the user account. The processor is further configured to receive a content item associated with the user. The processor is further configured to associate, based on the content prioritization user model, a content priority value with a content item. The content priority value corresponds to a predicted aspect of the user.

These and other embodiments can include one or more of the following features. The predicted aspect of the user can be a predicted interest of the user, or a predicted location corresponding to the user. The online resource can be a website, a service, or an Application Programming Interface ("API"). The content item when associated with the content priority value, results in a prioritized content item. The prioritized content item can be provided for display. Construction of the content prioritization model can include selection of one or more decision variables from a plurality of decision variables. The construction can further include selection of one or more user model variables from a plurality of user model variables. A statistical model can be implemented based on the selected decision variable(s) and user model variable(s). The statistical model can be trained based on a training set, which includes tuples of the selected decision variable(s) and user model variable(s). The decision variable can be the time distribution of the received user authentication events. The time distribution of the received authentication events can include a mean and a variance respectively of the time of the user authentication events. The content prioritization user model can be updated based on user feedback. User feedback can include a reaction of the user in response to the prioritized content item.

In another innovative aspect, the disclosed subject matter can be embodied in a machine-readable medium. The machine-readable medium includes machine-readable instructions for causing a processor to execute a method. The method includes receiving user authentication events corresponding to a user account. A user is associated with the user account. The method further includes determining a time distribution of the received user authentication events. The method further includes constructing, based on the determination, a content prioritization user model corresponding to the user associated with the user account. The method further includes receiving a content item associated with the user. The method further includes associating, based on the content prioritization user model, a content priority value with a content item. The content priority value corresponds to a predicted aspect of the user. The predicted aspect can be a predicted interest of the user in the content item, or a predicted location corresponding to the user. The method further includes providing a prioritized content item for display. The prioritized content item is the content item prioritized based on the associated content priority value.

These and other embodiments can include one or more of the following features. Construction of the content prioritization user model can include selecting one or more decision variables from a plurality of decision variables. The construction can further include selecting one or more user model variables from a plurality of user model variables. A statistical model can be implemented based on the selected decision variable(s) and user model variable(s). The statistical model can be trained based on a training set, which includes tuples of the selected decision variable(s) and user model variable(s).

Advantageously, the subject technology allows content items to be prioritized based on a user's predicted preferences. Prioritization can increase the likelihood of a user's interest level in, or engagement with the prioritized content items. Prioritization can also increase the relevance of a content item to the user. As an example of prioritization of content items within a website, a news website containing news articles can be considered. The news articles can be prioritized, and accordingly arranged based on a user's predicted preferences. For example, news articles predicted to be of most interest to the user, or related to the user's predicted residence location, can be presented at the top of the news website.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative, and not restrictive in nature.

DESCRIPTION OF DRAWINGS

Features of the subject technology are set forth in the appended claims. However, for purpose of explanation, several embodiments of the subject technology are set forth in the following figures.

FIG. 4 conceptually illustrates the use of logistic regression as an example of a statistical modeling approach for constructing a content prioritization user model, which can be used to prioritize content for a user.

FIG. 5 conceptually illustrates an example electronic system with which some aspects of the subject technology can be implemented.

DETAILED DESCRIPTION

Figure 1A:
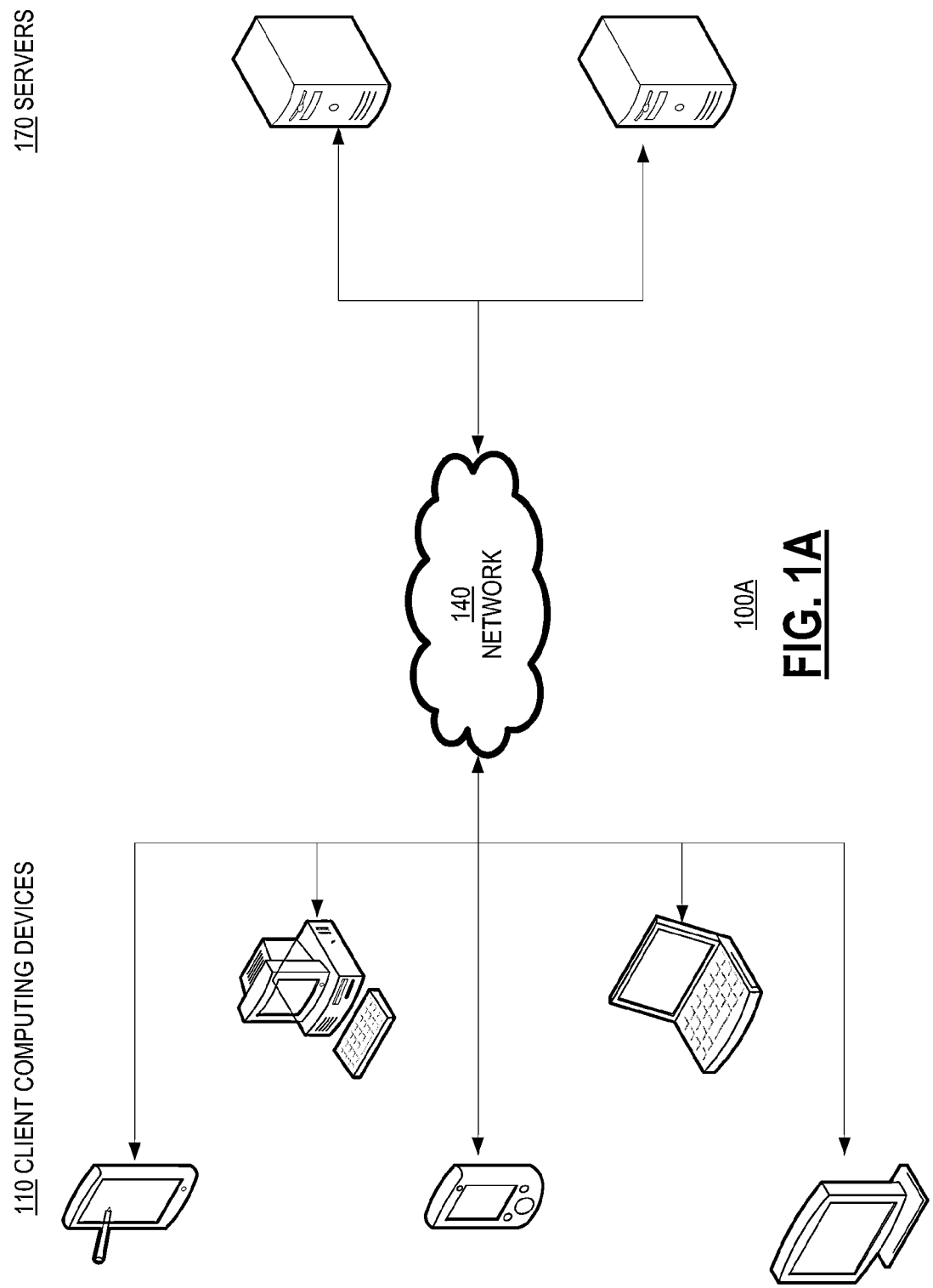
FIG. 1A illustrates an example of an architecture for prioritizing a content item for a user.

The detailed description set forth below is intended as a description of various configurations of the subject technology and is not intended to represent the only configurations in which the subject technology may be practiced. The appended drawings are incorporated herein and constitute a part of the detailed description. The subject technology is not limited to the specific details set forth herein and may be practiced without these specific details.

It should be noted that the term "online resource" as used herein encompasses its plain and ordinary meaning, including, but not limited to any aspect of a computing device that can be leveraged by another computing device. As an example, a website, a service, or an Application Programming Interface ("API") may be considered online resources.

A user may have specific interests, and may prefer to consume content related to those interests. Content can be prioritized for the user based on a listing of the user's interests. As an example, in a case where the user provides a listing of interests, e.g., in a user profile on a social networking website, and that listing includes the user's favorite music band, content related to that music band can be prioritized over content unrelated to that music band. The user's interests can also be ascertained based on content associated with the user. As an example, the user's email messages can be processed to ascertain the user's interests.

The subject disclosure provides systems and techniques for prioritizing a content item for a user, based on a content prioritization user model specific to that user. The systems and techniques described herein can also be used to prioritize content for a group of users based on the content prioritization user models of the underlying users. Similarly, the systems and techniques described herein may be used to group users based on similarities between their content prioritization user models.

A content prioritization user model specific to a user, can be constructed based on determining a time distribution (e.g., a time distribution of a day) of that user's user authentication events. User authentication events can include times at which the user conducts a transaction, for example authentication, with an online resource.

The term "transaction" as used herein encompasses its plain and ordinary meaning, including, but not limited to any aspect of an interaction between a first computing device (e.g., a client computing device, a server) and an online resource, that can be processed. A transaction can be account related, for example, authentication (e.g., a log on using a username and password, a log on using a token), a log off, establishment of a secure session, and so on. The transaction can also be financial, for example, a purchase, a transfer of funds, a return, and so on. Any authentication transactions associated with a user's user account can be a part of that user user's user authentication events.

The content prioritization user model can be used to predict various types of information specific to the user associated with the content prioritization user model. The types of information that can be predicted can include the user's interests, preferences, demographic profile, residential locations (e.g., current or past residential locations), family structure, life changes, and so on. Based on the information predicted about the user by that user's content prioritization user model, content priority values can be associated with content items. Content items can then be prioritized based on their respective associated content priority values. Content items that are prioritized based on their associated content priority values are referred to herein as prioritized content items.

In some implementations, a user may grant permission to allow collection or use of user information (e.g., user authentication events). Similarly, in some implementations, a user may be notified regarding the use of their information.

FIG. 1A illustrates an example of an architecture 100A for prioritizing a content item for a user. The architecture 100A includes client computing devices 110 and servers 170 connected over a network 140.

The client computing devices 110 can be, for example, mobile computers, tablet computers, mobile devices (e.g., a smartphone or PDA), desktop computers, set top boxes (e.g., for a television), video game consoles, or any other devices having appropriate processing capabilities, communications capabilities, and memory. Each client computing device 110 is configured to include an input device for accepting input from a user, and an output device to display information to the user.

The client computing devices 110 can be connected to the network 140. The network 140 can include any one or more of a personal area network (PAN), a local area network (LAN), a campus area network (CAN), a metropolitan area network (MAN), a wide area network (WAN), a broadband network (BBN), the Internet, and the like. Further, the network 140 can include, but is not limited to, any one or more of the following network topologies, including a bus network, a star network, a ring network, a mesh network, a star-bus network, tree or hierarchical network, and the like.

The servers 170 can be for example, stand-alone servers, shared servers, dedicated servers, cluster/grid servers (e.g., a server farm), or cloud servers. Each of the servers 170 may include one or more processors, communications modules, and memory. The servers 170 may be configured to distribute workload (e.g., for loadbalancing) across multiple servers.

The servers 170 may provide a variety of online resources. For example, the servers 170 may host a website, provide an Application Programming Interface ("API"), provide a service (e.g., an authentication service, a mail gateway), and so on.

Figure 1B:
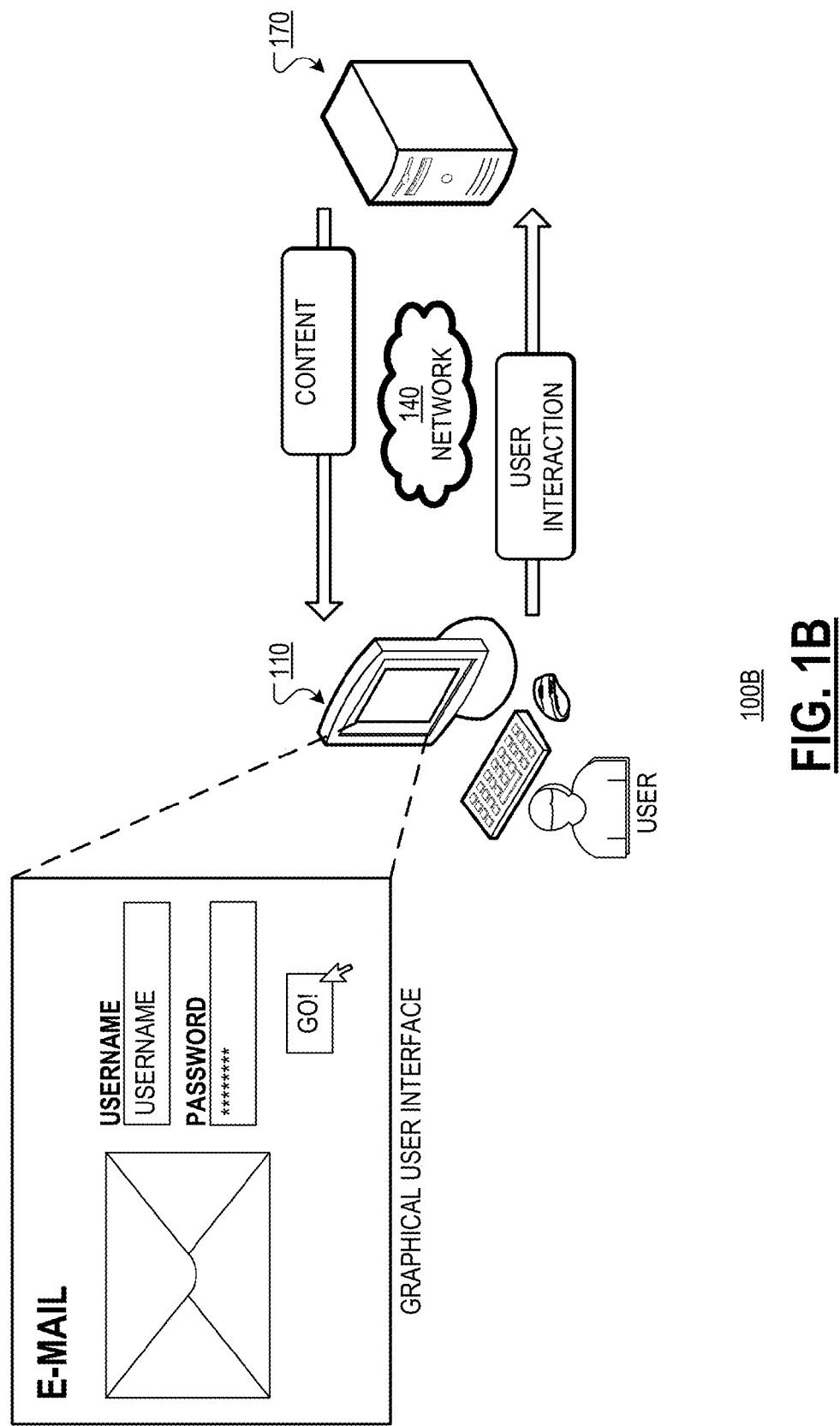
FIG. 1B illustrates an example of an arrangement of a client computing device and a server, of FIG. 1A.

FIG. 1B illustrates an example of an arrangement 100B of a client computing device 110 and a server 170 of FIG. 1A. In this example, a user using the client computing device 110 is logging into a website to check his email. In logging on to the website, the user enters a username and password as his authentication credentials. The authentication credentials are sent to the server 170, and once the user has logged in to the website, the user can interact with the website. As an example, when the user clicks on an email message, a request (e.g., an http request) is sent to the server 170, and in response the server 170 provides the content corresponding to the email message. In this example, the user's authentication credentials (username and password), requests for content, and so on constitute user authentication events.

In the example illustrated in FIG. 1B, the client computing device 110 and the server 170 were in communication without the involvement of a third-party online resource. That is, the server 170 was involved in communication that occurred after the initial authentication.

Figure 1C:
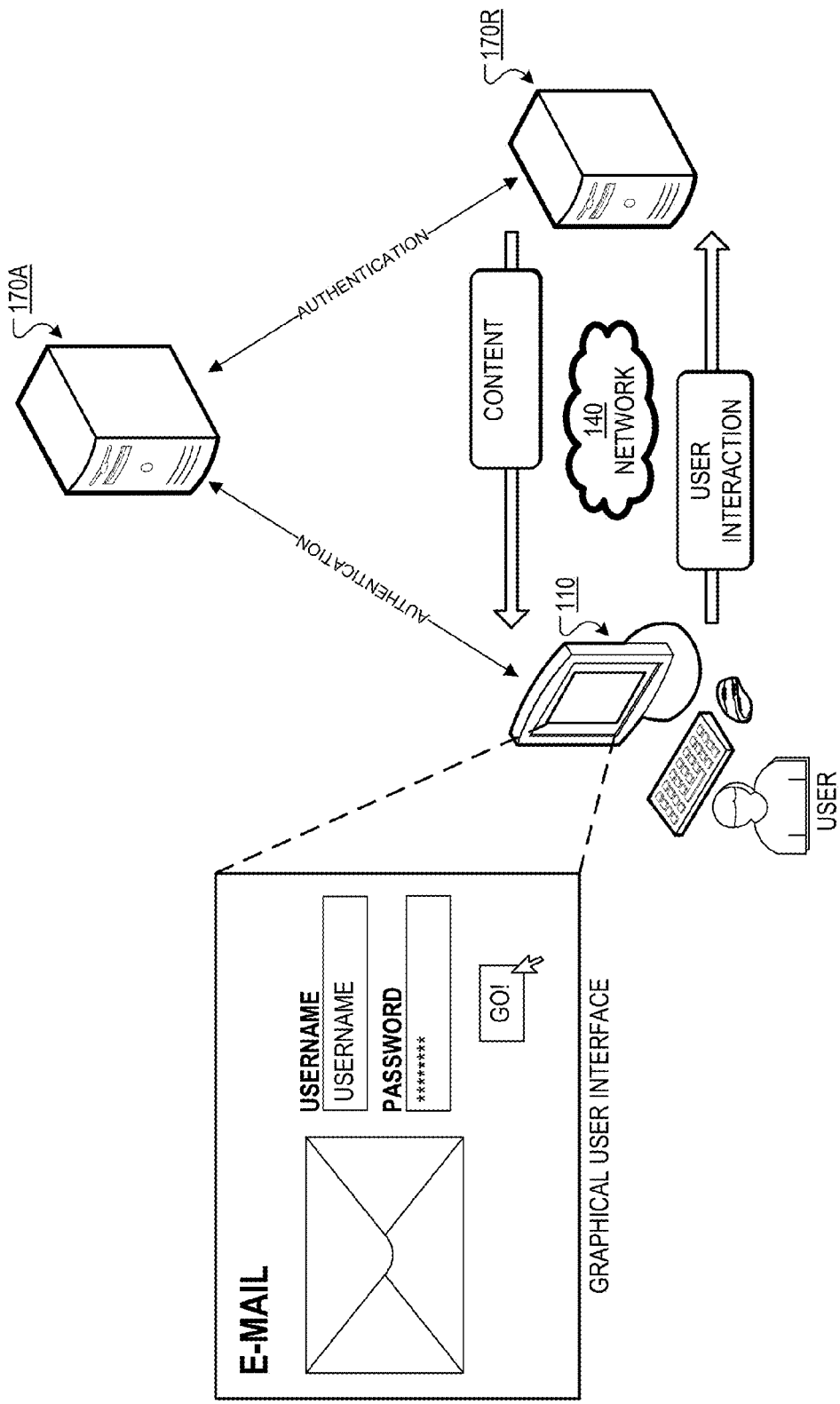
FIG. 1C illustrates an example of an arrangement of a client computing device, an authentication server, and a server providing an online resource, of FIG. 1A.

FIG. 1C illustrates an example of an alternate arrangement 100C of a client computing device 110, an authentication server 170A, and a server providing an online resource 170R. In this example, when the user wishes to access the online resource server 170R, the user is authenticated by an authentication server (or service) 170A. That is, the user's identity is verified by a server (e.g., 170A) other than the server (e.g., 170R) providing an online resource that the user is attempting to access. In such an arrangement, once the user has authenticated to the online resource 170R, the user's client computing device 110 may no longer communicate with the authentication server 170A. For example, once a session has been established between the client computing device 110 and the online resource 170R, any further communications (e.g., requests for content, transfer of content) may occur solely between the client computing device 110 and the online resource 170R. Thus, the authentication server 170A may not have any information about the user's interaction with the online resource 170R other than that which relates to the initial authentication. For example, the information available to the authentication server 170A may be limited to the identity of the online resource 170R that the user authenticated to, and the time at which the authentication occurred.

Figure 2:
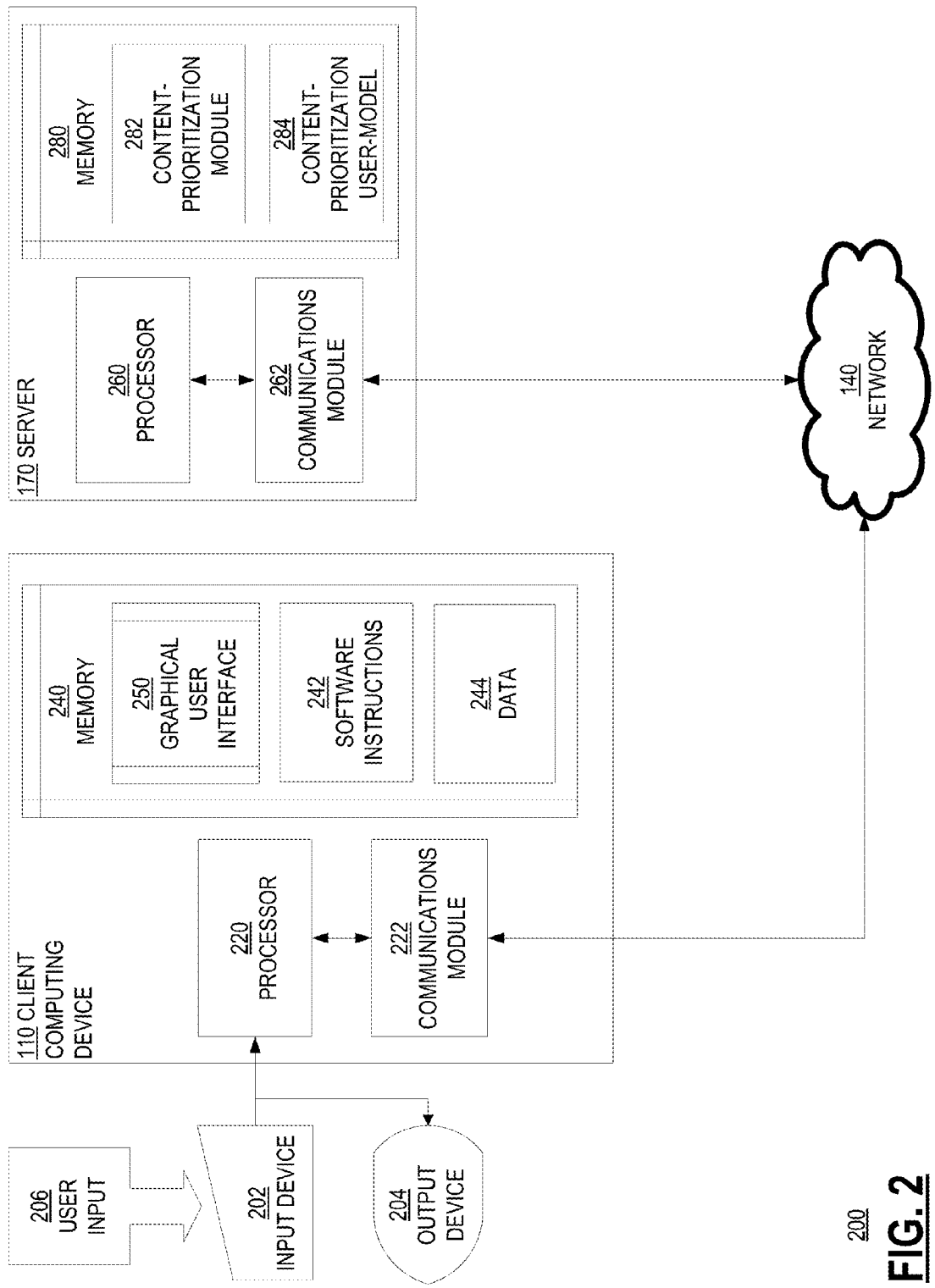
FIG. 2 is a block diagram illustrating an example of a client computing device and a server of FIGS. 1A-1C.

FIG. 2 is a block diagram 200 illustrating an example of a client computing device 110 and a server 170 in the architecture 100 of FIG. 1A according to certain aspects of the disclosure.

The client computing device 110 includes an input device 202, an output device 204, a processor 220, a communications module 222, and memory 240. The input device 202 can be a touchscreen, a mouse, a keyboard, or any other device to enable a user to supply input 206 to the client computing device 110. The output device 204 can be a display screen. Input 206 received via the input device 202 can be processed locally on the client computing device 110 or the server 170. The input 206 can include keystrokes (e.g., to provide authentication credentials), mouse operations (e.g., click, double-click, right-click), touchscreen operations (e.g., single-touch and multi-touch gestures), and so on.

The client computing device 110 is connected to the network 140 via a communications module 222. The communications module 222 is configured to interface with the network 140 to send and receive information, e.g., data, requests, responses, and commands to other devices on the network 140. The communications module 222 can be, for example, a modem or Ethernet card.

The memory 240 includes a graphical user interface 250 which allows a user to interact with the computing device 110 or the server 170, and can be used to display information to the user. The graphical user interface 250 may be installed locally at the computing device 110 or downloaded from the server 170. The memory 240 further includes software instructions 242 that can be read by the processor 220 to enable interaction with the server 170. For example, the software instructions 242 can include an operating system or an application (e.g., a web browser) that can be processed by the processor 220. Data generated or stored at the client computing device 110 can be stored as data 244.

The server 170 includes a memory 280, a processor 260, and a communications module 262. The memory 280 includes software instructions that can be read by the processor 260 to implement a content prioritization module 282 for prioritizing a content item for a user.

The content prioritization module 282 receives user authentication events corresponding to a user account. A user is associated with the user account. The content prioritization module 282 determines a time distribution (e.g., a time distribution of a day) of the received user authentication events. The content prioritization module 282 constructs, based on the determination, a content prioritization user model 284 corresponding to the user associated with the user account. The content prioritization module 282 receives a content item associated with the user. The content prioritization module 282 associates, based on the content prioritization user model 284, a content priority value with the content item. The content priority value corresponds to a predicted aspect of the user.

The server 170 is connected to the network 140 via a communications module 262. The communications module 262 is configured to interface with the network 140 to send and receive information, e.g., data, requests, responses, and commands to other devices on the network 140. The communications module 262 can be, for example, a modem or Ethernet card.

The processor 260 of the server 170 is configured to execute instructions, e.g., instructions physically coded into the processor 260, instructions received from the memory 280, or a combination of both. As an example, the processor 260 of the server 170 executes instructions for prioritizing a content item for a user.

Once the instructions from the memory 280 are loaded, the processor 260 is configured to execute the instructions to receive user authentication events corresponding to a user account. A user is associated with the user account. The received user authentication events correspond to authentication, based on the user account, to an online resource. The processor 260 is further configured to determine a time distribution of the received user authentication events. The processor 260 is further configured to construct, based on the determination, a content prioritization user model 284 corresponding to the user associated with the user account. The processor 260 is further configured to receive a content item associated with the user. The processor 260 is further configured to associate, based on the content prioritization user model 284, a content priority value with a content item. The content priority value corresponds to a predicted aspect of the user.

Figure 3:
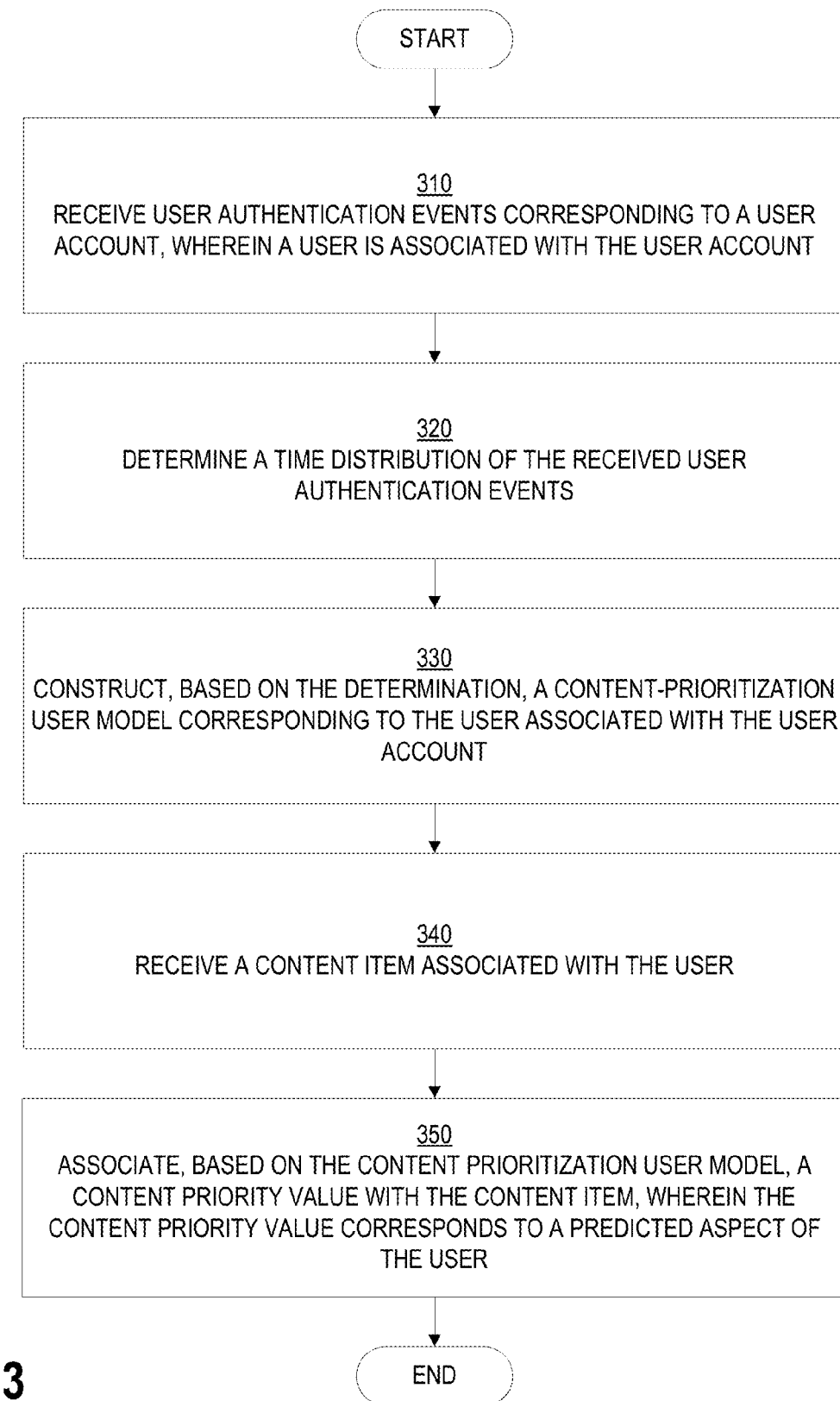
FIG. 3 illustrates an example of a process for prioritizing a content item for a user.

FIG. 3 illustrates an example of a process 300 for prioritizing a content item for a user. It should be noted that although process 300 is described herein with reference to the systems of FIGS. 1A-C and 2, process 300 is not limited to such, and can be performed by other systems or configurations.

In step 310, user authentication events corresponding to a user account are received by a content prioritization module 282. A user is associated with the user account. The user's user authentication events may be received from various sources including, for example, an authentication server (e.g., 170A) providing an authentication service. In some instances, an authentication service may be referred to as an identity service or an identity verification service. The authentication service may be cross-platform. That is, a user account based on the authentication service may be used for multiple online resources operated by unrelated entities.

In step 320, the content prioritization module 282 determines a time distribution of the received user authentication events. As an example, the content prioritization module 282 can determine the time distribution corresponding to a time of day, day of week, day of the month, day of the year, week of the month, week of the year, and so on. Similarly, the content prioritization module 282 can determine the time distribution with respect to business hours, public holidays, or any other temporal frame of reference. As an example, the content prioritization module 282 can calculate the user's frequency or time distribution of logging on to a particular online resource.

In step 330, the content prioritization module 282 constructs, based on the determination of step 320, a content prioritization user model 284 corresponding to the user associated with the user account.

To construct the content prioritization user model 284, one or more decision variables are selected from a number of possible decision variables. To illustrate, the example of FIG. 1C may be considered. In the example of FIG. 1C, the information about the user, available to the authentication server 170A, is limited to the identity of the online resource 170R, and the time at which the authentication occurred. Because the user's interaction with the online resource 170R in this example includes only this limited information, the decision variables are based on calculations with respect to time.

Thus, when user authentication events are received, as described in step 310, the content prioritization module 282 determines a time distribution of the user authentication events, as described in step 320. The decision variables are therefore of a temporal nature. In this example, the decision variables are a user account time distribution, and a user account frequency.

To construct the content prioritization user model 284, one or more user model variables are also selected from a number of possible user model variables. The user model variables can be the probabilities of various aspects of a user associated with the user model. For example, user model variables can include a probability of the user's presence at a particular location, e.g., a probability of the location of the user's residence. As another example of a probability of an aspect of the user associated with the user model, the user model variables can also include a probability of the user's interest in a particular subject.

Based on the decision variable values, and user model variable values, a number of observation tuples can be used to develop a training set to train the content prioritization user model 284. Once the content prioritization user model 284 is trained, it can be used to predict various types of information specific to the user associated with that user model.

In step 340, the content prioritization module 282 receives a content item associated with the user. The content item may be received based on a request by the user, or may be sent to the user regardless of whether the user has requested it. The content item may be considered to be associated with the user based on either being requested (e.g., pulled) by the user, or based on being sent (e.g., pushed) to the user.

As an example of a content item requested by the user, when the user clicks on an email inbox in a web based email service, the user requests the contents of the inbox. That is, the user requests email messages that are in the user's email inbox, and therefore, each of the email messages and any other information displayed to the user may be considered an example of a content item that has been requested.

Similarly, when the user points a web browser to a website, the user requests the contents of that website. For example, if the user browses to a news website, the user requests the news stories displayed (e.g., in frames) on the news website.

Requests for content items need not be explicitly generated or initiated by the user. For example, a user's computing device 110 may be configured to check the user's email at an interval. Based on that configuration, email downloaded by the user's computing device 110 may be considered requested by the user.

As an example of content that is sent to the user, a user may receive emails from a number of senders. Each of those emails, when they are received by the user's mail service, may be considered content items that are sent to the user. Similarly, content that is delivered to the user's computing device 110 using push mechanisms may also be considered content that is sent to the user.

In step 350, the content prioritization module 282 associates, based on the content prioritization user model 284, a content priority value with the content item. The content priority value associated with content item corresponds to a predicted aspect of the user. Predicted aspects of a user can include for example, the user's interests, preferences, demographic profile, residential locations (e.g., current or past residential locations), family structure, life changes, and so on.

Once content priority values have been associated with respective content items, the resulting prioritized content items can be provided for further processing. For example, the resulting prioritized content items can be provided for display. As an example, prioritized content items can be provided to a web server (e.g., 170) for display to a user, within a web browser on that user's client computing device 110.

The content prioritization user model 284 can be updated based on a user's user feedback. User feedback can be a reaction of a user in response to a content item (e.g., a prioritized content item) that has been prioritized for the user. A user's reaction can include, clicking on a prioritized content item, using a mouse pointer to hover over it, dismissing/closing it, minimizing it, and so on.

FIG. 4 conceptually illustrates the use of logistic regression as an example of a statistical modeling approach for constructing a content prioritization user model 284, which can be used to prioritize content for a user.

It should be noted that logistic regression has been selected as an example to provide context, and several other statistical models or modeling approaches other than logistic regression may be used to construct the content prioritization user model 284.

The workflow 400 of FIG. 4 includes two conceptual parts, a statistical model training flow 415, and an interest or profile prediction flow 425. The statistical model training flow 415 includes using a training set to follow a statistical model training procedure 410. Then, by using model parameters, a statistical model for predicting interests or profile of a user 420 can be prepared. The interest or profile prediction flow 425 includes providing a user's user authentication events to the statistical model 420, and receiving estimated probabilities of a user's interest and locations. Providing a user's user authentication events can include applying the statistical model 420 to the user's user authentication events.

As explained above, in a statistical model (e.g., 420, 284), decision variables and user model variables can be selected from a large group of possible variables and metrics. In this example, the decision variables selected in the logistic regression model are the time distribution of a day of the user's user authentication events, which include the mean and variance of the time of the user's user authentication events. The mean and variance of the frequency of the user's user authentication events are denoted by $Z_{0,0}$, $Z_{0,1}$, respectively. The user's user authentication event frequencies on specific online resources (e.g., websites) are denoted by $X_{1,0}$, $X_{1,1}$, $X_{1,2}$, $X_{2,0}$, $X_{2,1}$, $X_{2,2}$, ..., $X_{n,0}$, $X_{n,1}$, $X_{n,2}$. The user authentication event frequencies, indicated by the second numeral in the subscript, correspond to a 7-day average, 30 day average, and 1-year average respectively, for online resources 1 through n, or groups of online resources 1 through n.

That is, $X_{1,0}$, $X_{1,1}$, and $X_{1,2}$ correspond to a 7-day average, a 30-day average, and a 1-year average respectively for a first online resource, or a first group of online resources. Similarly, $X_{2,0}$, $X_{2,1}$, and $X_{2,2}$ correspond to a 7-day average, a 30-day average, and a 1-year average respectively for a second online resource, or a second group of online resources. The 7-day average, 30-day average, and 1-year average may be calculated for any number (e.g., n) of online resources.

In this example, the user model variables in the logistic regression model are (1) the probabilities $G_0$, $G_1$, $G_2$ ... $G_m$ of the user's presence at locations 1 through m, and (2) the probabilities $P_0$, $P_1$, $P_2$ ... $P_s$ of the user's interest in subjects 1 through s.

With respect to a user's presence at a location, a single user may have a number of corresponding probabilities. For example, the probabilities $G_0$, $G_1$, $G_2$ ... $G_m$ that correspond to a user, indicate the likelihood of that user's presence at a first location, a second location, a third location, and so on for a number (m) of locations. Similarly, with respect to interest in a subject, a single user may have a number of corresponding probabilities. For example, $P_0$, $P_1$, $P_2$ ... $P_s$ that correspond to a user, indicate the likelihood of that user's interest in a first subject, a second subject, a third subject, and so on for a number (s) of subjects.

The logistic regression formulas in this model are:
(1) for each location probability, $$G_i = \frac{1}{1 + e^{-F_i}},$$

where $$F_i = \beta + \beta_{0,0} Z_{0,0} + \beta_{0,1} Z_{0,1} + \beta_{1,0} X_{1,0} + \beta_{1,1} X_{1,1} + \beta_{1,2} X_{1,2} + \ldots + \beta_{n,0} X_{n,0} + \beta_{n,1} X_{n,1} + \beta_{n,2} X_{n,2}, \text{ and}$$

(2) for each interest probability, $$P_i = \frac{1}{1 + e^{-F_i}},$$

where $$F_i = \gamma + \gamma_{0,0} Z_{0,0} + \gamma_{0,1} Z_{0,1} + \gamma_{1,0} X_{1,0} + \gamma_{1,1} X_{1,1} + \gamma_{1,2} X_{1,2} + \ldots + \gamma_{n,0} X_{n,0} + \gamma_{n,1} X_{n,1} + \gamma_{n,2} X_{n,2}.$$

The parameters in this statistical model are $\beta$ and $\gamma$. Statistical learning algorithms, e.g., logistic regression as used in this example, can be used to train a user model and optimize the parameters in it, such that different types or groups of users can be modeled for different probabilities of locations or interests.

A training set may be used to train the statistical model 420. A training set consists of a number of observation tuples, for example, decision variable values, and user model variable values. In this example, the decision variables include the user authentication event time distribution and frequencies, and the user model variables include user feedback on the user's locations and interests.

A user's user authentication events can be provided to the statistical model 420 to receive estimated probabilities of the user's interests and locations. That is, the statistical model 420 can be applied to a user's user authentication events to obtain a user's estimated probabilities of interests and locations.

FIG. 5 conceptually illustrates an example electronic system with which some aspects of the subject technology can be implemented. For example, FIG. 5 illustrates an example of a computer system 500 with which the client computing device 110 or the server 170 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., client computing device 110, server 170) includes a bus 508 or other communication mechanism for communicating information, and a processor 502 (e.g., processor 220, processor 260) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 240, memory 280), e.g., a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages e.g., data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages e.g., array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 e.g., a magnetic disk or optical disk, coupled to bus 508 for storing information and instructions. Computer system 500 may be coupled via input/output module 510 to various devices. The input/output module 510 can be any input/output module. Examples of input/output modules 510 include data ports e.g., USB ports. The input/output module 510 is configured to connect to a communications module 512. Examples of communications modules 512 (e.g., communications module 222, communications module 262) include networking interface cards, e.g., Ethernet cards and modems. In certain aspects, the input/output module 510 is configured to connect to a plurality of devices, e.g., an input device 514 (e.g., input device 202) or an output device 516 (e.g., output device 204). Examples of input devices 514 include a keyboard and a pointing device, e.g., a mouse or a trackball, by which a user can provide input to the computer system 500. Other kinds of input devices 514 can be used to provide for interaction with a user as well, e.g., a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Examples of output devices 516 include display devices, e.g., a CRT (cathode ray tube) or LCD (liquid crystal display) monitor, for displaying information to the user.

According to one aspect of the present disclosure, the client computing device 110 can be implemented using a computer system 500 in response to processor 502 executing one or more sequences of one or more instructions contained in memory 504. Such instructions may be read into memory 504 from another machine-readable medium, e.g., data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 140) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 can include client computing devices and servers. A client computing device and server are generally remote from each other and typically interact through a communication network. The relationship of client computing device and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, or a television set top box.

The term "machine-readable storage medium" or "computer readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, e.g., data storage device 506. Volatile media include dynamic memory, e.g., memory 504. Transmission media include coaxial cables, copper wire, and fiber optics, including the wires that include bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

While this specification contains many specifics, these should not be construed as limitations on the scope of what may be claimed, but rather as descriptions of particular implementations of the subject matter. Certain features that are described in this specification in the context of separate implementations of the subject technology can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A method comprising:
   receiving user authentication events, each authentication event comprising an identity verification for the user in connection with accessing an online resource;
   determining a time distribution of the received user authentication events;
   constructing, based on the determining, a content prioritization user model corresponding to the user, wherein the content prioritization model is based on at least one decision variable and at least one user model variable, the at least one decision variable corresponding to the time distribution of the received user authentication events, and the at least one user model variable corresponding to at least one of a location of the user or an interest of the user;
   receiving a content item associated with the user; and
   associating, based on the content prioritization user model, a content priority value with the content item, wherein the content priority value corresponds to a predicted aspect of the user.

2. The method of claim 1, further comprising:
   providing for processing, a prioritized content item, wherein the prioritized content item is the content item prioritized based on the associated content priority value.

3. The method of claim 1, further comprising:
   updating the content prioritization user model based on a user feedback, wherein the user feedback comprises a reaction of the user in response to a prioritized content item, wherein the prioritized content item is the content item prioritized based on the associated content priority value.

4. The method of claim 1, wherein the predicted aspect of the user comprises at least one of a predicted interest of the user or a predicted location corresponding to the user.

5. The method of claim 1, wherein the time distribution of the received user authentication events comprises a mean and a variance respectively of the time of the user authentication events.

6. The method of claim 1, wherein the constructing the content prioritization user model comprises:
   selecting the at least one decision variable from a plurality of decision variables;
   selecting the at least one user model variable from a plurality of user model variables;
   implementing a statistical model based on the selected at least one decision variable and the selected at least one user model variable; and
   training the statistical model based on a training set, wherein the training set comprises tuples of the selected at least one decision variable and the selected at least one user model variable.

7. The method of claim 6, wherein the statistical model comprises logistic regression using the at least one decision variable and at least one user model variable.

8. The method of claim 1, wherein the received user authentication events correspond to authentication based on user account associated with the user.

9. The method of claim 8, wherein the online resource comprises at least one of a website, a service, or an Application Programming Interface ("API").

10. A system comprising:
    a memory comprising instructions; and
    a processor configured to execute the instructions to:
       receive user authentication events, each authentication event comprising an identity verification for the user in connection with accessing an online resource;
       determine a time distribution of the received user authentication events;
       construct, based on the determination, a content prioritization user model corresponding to the user, wherein the content prioritization model is based at least one decision variable and at least one user model variable, the at least one decision variable corresponding to the time distribution of the received user authentication events, and the at least one user model variable corresponding to at least one of a location of the user or an interest of the user;

receive a content item associated with the user; and associate, based on the content prioritization user model, a content priority value with the content item, wherein the content priority value corresponds to a predicted aspect of the user.

11. The system of claim 10, wherein the processor is further configured to:

provide for display, a prioritized content item, wherein the prioritized content item is the content item prioritized based on the associated content priority value.

12. The system of claim 10, wherein the processor is further configured to:

update the content prioritization user model based on a user feedback, wherein the user feedback comprises a reaction of the user in response to a prioritized content item, wherein the prioritized content item is the content item prioritized based on the associated content priority value.

13. The system of claim 10, wherein the predicted aspect of the user comprises at least one of a predicted interest of the user or a predicted location corresponding to the user.

14. The system of claim 10, wherein the online resource comprises at least one of a website, a service, or an Application Programming interface ("API").

15. The system of claim 10, wherein to construct the content prioritization user model, the processor is further configured to:

select the at least one decision variable from a plurality of decision variables;

select the at least one user model variable from a plurality of user model variables;

implement a statistical model based on the selected at least one decision variable and the selected at least one user model variable, and wherein the statistical model comprises logistic regression using the at least one decision variable and at least one user model variable; and train the statistical model based on a training set, wherein the training set comprises tuples of the selected at least one decision variable and the selected at least one user model variable.

16. The system of claim 10, wherein the time distribution of the received user authentication events comprises a mean and a variance respectively of the time of the user authentication events.

17. A machine-readable storage medium comprising machine-readable instructions for causing a processor to execute a method, the method comprising:

receiving user authentication events, each authentication event comprising an identity verification for the user in connection with accessing an online resource;

determining a time distribution of the received user authentication events;

constructing, based on the determining, a content prioritization user model corresponding to the user, wherein the content prioritization model is based on at least one decision variable and at least one user model variable, the at least one decision variable corresponding to the time distribution of the received user authentication events, and the at least one user model variable corresponding to at least one of a location of the user or an interest of the user;

receiving a content item associated with the user;

associating, based on the content prioritization user model, a content priority value with the content item, wherein the content priority value corresponds to a predicted aspect of the user; and providing for display, a prioritized content item, wherein the prioritized content item is the content item prioritized based on the associated content priority value.

18. The machine-readable medium of claim 17, wherein the constructing the content prioritization user model further comprises:

selecting the at least one decision variable from a plurality of decision variables;

selecting the at least one user model variable from a plurality of user model variables;

implementing a statistical model based on the selected at least one decision variable and the selected at least one user model variable; and training the statistical model based on a training set, wherein the training set comprises tuples of the selected at least one decision variable and the selected at least one user model variable.

* * * * *